United States Patent
Nason et al.

(10) Patent No.: US 7,090,348 B2
(45) Date of Patent: Aug. 15, 2006

(54) METHOD FOR DESIGNING SPECTACLE LENSES TAKING INTO ACCOUNT AN INDIVIDUAL'S HEAD AND EYE MOVEMENT

(75) Inventors: Richard J. Nason, Roanoke, VA (US);
Amitava Gupta, Roanoke, VA (US);
Arkady Selenow, Irvington, NY (US);
Kenneth J. Ciuffreda, Woodbridge, NJ (US); George A. Zikos, Riverdale, NY (US); Edgar V. Menezes, Roanoke, VA (US)

(73) Assignee: Essilor International (Compagnie Generale d'Optique), (FR)

( * ) Notice: Subject to any disclaimer, the term of this patent is extended or adjusted under 35 U.S.C. 154(b) by 0 days.

(21) Appl. No.: 10/695,047

(22) Filed: Oct. 28, 2003

(65) Prior Publication Data

US 2005/0088616 A1    Apr. 28, 2005

(51) Int. Cl.
*G02C 7/02* (2006.01)
*A61B 3/10* (2006.01)

(52) U.S. Cl. ...................... 351/177; 351/205
(58) Field of Classification Search ................ 351/159, 351/168–172, 177, 205
See application file for complete search history.

(56) References Cited

U.S. PATENT DOCUMENTS

| 4,145,122 A | 3/1979 | Rinard et al. |
|---|---|---|
| 4,852,988 A | 8/1989 | Velez et al. |
| 4,856,891 A | 8/1989 | Pflibsen et al. |
| 5,204,703 A | 4/1993 | Hutchinson et al. |
| 5,345,281 A | 9/1994 | Taboada et al. |
| 6,027,216 A | 2/2000 | Guyton et al. |
| 6,152,563 A | 11/2000 | Hutchinson et al. |
| 6,196,685 B1 * | 3/2001 | Roffman et al. ............. 351/177 |
| 6,817,713 B1 * | 11/2004 | Ueno ......................... 351/177 |
| 2002/0187860 A1 * | 12/2002 | Shoane ....................... 473/405 |
| 2003/0107702 A1 | 6/2003 | Yamakajl |

OTHER PUBLICATIONS

Simonet, P et al, Eye and Head Movement for Chnages in Gaze in a Presbyopic Population, Program at ARVO, May 6, 2003.
Selenow, A. et al., "Point of Regard in an Ophthalmic Lens", Poster Presentation, ARVO, May 7, 2003.
Han, Y. et al., "Dynamic Interaction of Eye and Head Movements When Reading with Single Vision and Progressive Lenses in a Simulated Computer-Based Environment". 44 Invest. Ophthalmology & Visual Sci., 1534-1545, Apr. 2003.
Fisher, Scott, "Relationship Between Contour Plots and the Limits of 'Clear and Confortable' Vision in the Near Zone of Progressive Addition Lenses". 74Opt. and Vision Sci., 527-531, Jul. 1997.
Afandor, A. J. et al., "Eye and Head Contribution to Gaze at Near Through Multifocals; The Usable Field of View". 63A.m J. Opt. & Physiological Optics, 187-192, 1986.
Han, Y. et al., "Static Aspects of Eye and Head Movements During Reading in a Simulated Computer-Based Environment With Single-Vision and Progressive Lenses". 44 Invest. Ophthalmology & Visual Sci., 145-153, Jan. 2003.

* cited by examiner

*Primary Examiner*—Scott J. Sugarman
(74) *Attorney, Agent, or Firm*—Fish & Richardson P.C.

(57) ABSTRACT

A method for designing ophthalmic lenses, including progressive addition lenses, and lenses produced by the method are provided. The method permits the direct correlation of an individual's subjective assessment of the lens' performance and the objective measure of lens performance relative to the individual. The method permits generation of lens designs based on the head and eye movement of the individual and the designing of customized lenses.

16 Claims, 1 Drawing Sheet

METHOD FOR DESIGNING SPECTACLE LENSES TAKING INTO ACCOUNT AN INDIVIDUAL'S HEAD AND EYE MOVEMENT

FIELD OF THE INVENTION

The present invention relates to methods for designing ophthalmic lenses. In particular, the invention provides a method for designing spectacle lenses by taking into account the head and eye movement of an individual. The invention also provides a method for designing a lens customized to an individual.

BACKGROUND OF THE INVENTION

The use of ophthalmic lenses for the correction of ametropia is well known. For example, multifocal lenses, such as progressive addition lenses ("PALs"), are used for the treatment of presbyopia. The progressive surface of a PAL provides far, intermediate, and near vision in a gradual, continuous progression of increasing dioptric power from far to near focus.

Any number of methods for designing spectacle lenses are known. Typically, these methods involve one or more of benchmarking of known designs, developing theoretical target values for control optical parameters, obtaining subjective patient feedback, and using objective testing methods to produce a lens design. One disadvantage of these design methods is that they do not correlate the patient feedback and objective testing to precise locations on the lens. Thus, the point at which an individual's line-of-sight actually intersects with the lens' surface while the individual is performing a given task frequently differs from that calculated by the lens designer. This results in the lens wearer, especially the PAL wearer having to move the eye and head to maintain adequate visual resolution through the lens.

Additionally, it is known that certain parameters control optimal visual comfort for the lens wearer. These parameters include, without limitation, clarity of vision, comfort over sustained periods of use, ease of changing focus, and the amount of head and eye movement required by the lens wearer. Conventional design methods do not account for these parameters with any precision and provide little to no guidance for design optimization processes requiring definition of merit functions incorporating one or more of these parameters. Therefore, a method for designing lenses that overcomes these disadvantages is needed.

DESCRIPTION OF THE INVENTION AND ITS PREFERRED EMBODIMENTS

Figure 1:
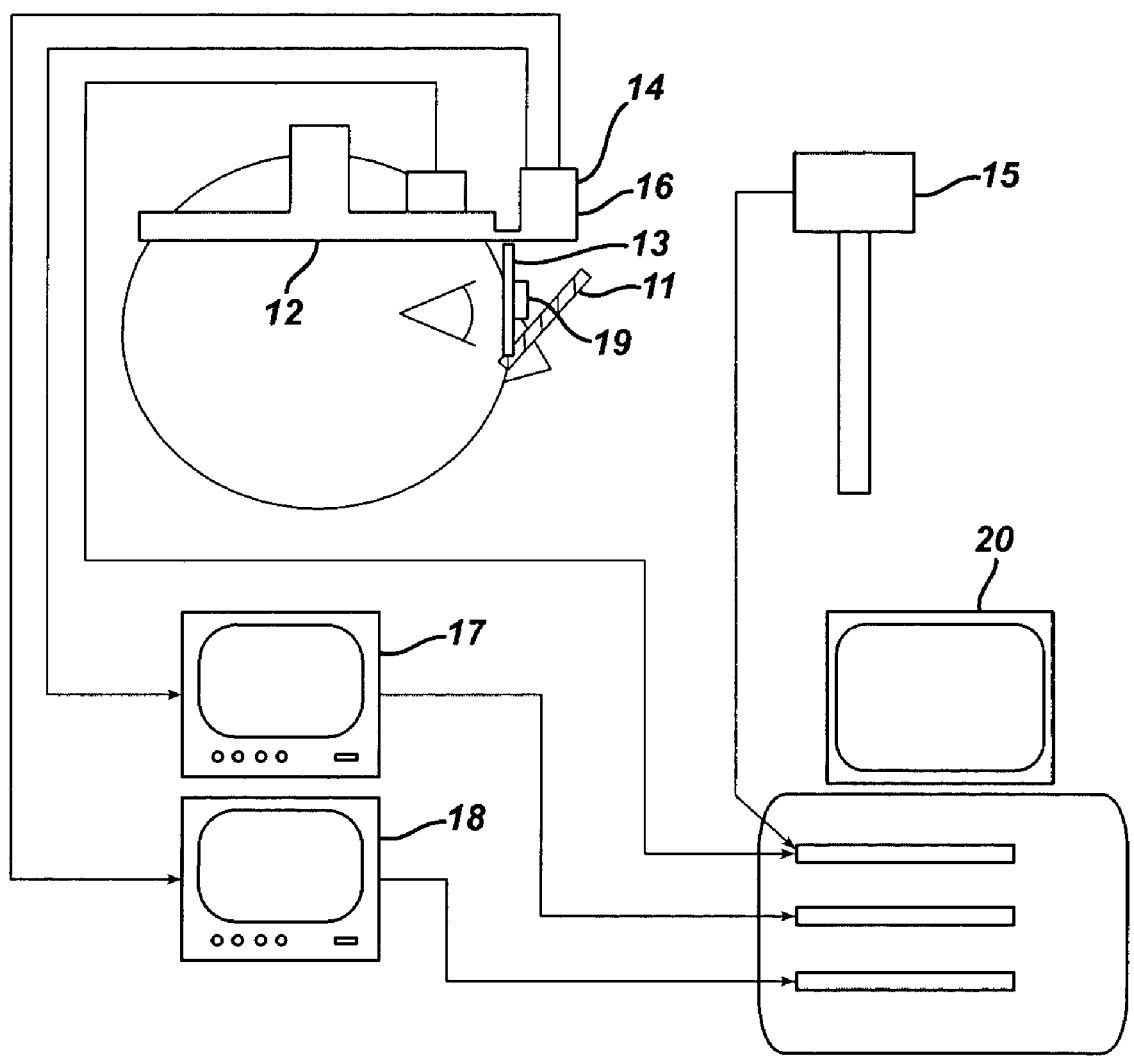
FIG. 1 is a schematic diagram of a head and eye movement apparatus of the invention.

In the present invention, a method for designing ophthalmic lenses, including progressive addition lenses, and lenses produced by the method are provided. The method of the invention permits the direct correlation of an individual's subjective assessment of the lens' performance and the objective measure of lens performance relative to the individual. The method permits generation of lens designs based on the head and eye movement of the individual and the designing of customized lenses.

Conventional lens design methods do not permit controlling optical parameters to be designed with any precision. For example, for PALs, controlling parameters include, without limitation, distance vision width, intermediate vision or channel width, near vision width, channel length, magnitude of maximum unwanted astigmatism, power gradient, and distance of the maximum unwanted astigmatism from the optical center of the design. For single vision lenses, controlling parameters are radius of contour of the spherical power that is less than or equal to 0.25 diopters of the nominal sphere power, radius of the contour of unwanted astigmatism which astigmatism is less than or equal to 0.25 diopters, and radius of contour of the visual acuity that is less than −0.2 units from the target value at the lens' optical center.

In one embodiment, the invention provides a method for designing a spectacle lens, comprising, consisting essentially of, and consisting of a.) providing a first lens having a first design; b.) identifying at least one point of regard for the first lens; c.) obtaining information regarding the lens' performance using the at least one point of regard; and d.) modifying the first design using the information obtained in step c.) to provide a second lens having a second design.

For purposes of the invention, by "point of regard" or "POR" is meant a point on the front, or object side, surface of the lens at which the individual's visual axis intersects with the lens. By "visual axis" is meant the line of sight, passing through the eye's nodal points, between a viewed object and the observer's fovea. Nodal points are theoretical pairs of points in an optical system, such as the eye, for which, if an off-axis ray is directed at one point of the pair, the ray will leave the system with the same direction as the off-axis ray and appear to emanate from the other nodal point of the pair.

The invention may be used to design single vision or multifocal spectacle lenses, but may find its greatest utility in the design of progressive addition lenses. By "progressive addition lens" or "progressive lens" is meant a lens that has at least one progressive addition surface. By "progressive addition surface" or "progressive surface" is meant a continuous, aspheric surface having far and near vision zones only, intermediate and near vision zones only, or far, near and intermediate vision zones wherein the intermediate zone is a zone of increasing or decreasing dioptric power connecting the far and near vision zones.

In the first step of the method of the method of the invention, a first lens is provided by any conventionally available method. The lens may be designed using commercially available software including, without limitation, ZEMAX™, CODE V™, OSLO™, and the like. Typically, the lens will be designed by describing each surface of the lens. For example, the progressive surface or surfaces of the lens may be described, or represented, as continuous, differentially continuous, or twice differentially continuous. The shape that the described surface may take is limited only by the density of the elements or coefficients used to describe the surface. Preferably, the first lens is a lens in which both the front, or object side, and the back, or eye side, surface are progressive surfaces.

Once the designing of the first lens is complete, a lens according to the first design is produced by any convenient method. Methods for producing such lenses include, without limitation, machining of a glass or polymeric article such as a semi-finished blank, molding, such as by injection or cast molding, or a combination of machining and molding.

In the second step of the invention, the lens is used to identify at least one, and preferably a plurality, of points of regard for an individual or a plurality of individuals. Identification of one or more points of regard for a population of individuals permits determination of an average location for each point of regard. The designer may use the POR information to identify the areas of the lens that are being used for the performance of a task. Preferably, it is desirable to match the overall profile of the lens to the POR by either placing prism reference point, or preferably the fitting point, at the center of the distance POR. For progressive addition lenses, the center of the near zone is placed at the center of the near POR, which determines channel length and inset of the lens. Alternatively and preferably, the optical center may be located at the POR for a particular individual. Preferably, a plurality of PORs are mapped while objects are viewed by the individual at at least two distances. More preferably, the mapping is carried out while objects are viewed at distant, near, and intermediate locations.

By "distant location" is meant a location at a distance greater than about 80 cm from the eye. By "intermediate location" is meant a location at a distance about 45 to about 80 cm from the eye. By "near location" is meant a location at a distance about 5 to about 45 cm from the eye.

In the method of the invention, the points of regard may be measured using commercially available head and eye movement measurement devices that are modified. Any suitable commercially available eye movement device may be used and modified including, without limitation, ISCAN™, ETL-400, RK-726 PCT and the like. Suitable commercially available head movement devices that may be used and modified include, without limitation, Polhemus INSIDETRAK™, Ascension Magnetic Head Tracking System, and the like. Typically, eye and head movement measuring devices suitable for use in the method of the invention include a head mounted recording device, eye and scene imaging device, and a computer.

For use in the invention, the commercially available systems are modified to provide one or more scene cameras that point towards the lens wearer's spectacle lens. The scene camera may be any commercially available small CCD device such as an Elmo MN30 LIPSTICK™ camera.

Additionally, the calibration techniques for the head and eye movement system must be modified to permit calibration for the POR to the eye movements. Modification of the calibration may be carried out in any convenient manner. In one method of calibration, the cameras are adjusted to produce an infrared image that has no shadows or reflections and the pupil and corneal reflex contrast are adjusted. The individual's eye movements are calibrated by initiating eye movement device's calibration routine and by having the individual fixate on each of five points on a fixed target while the software automatically notes the horizontal (x) and vertical (y) pixel location values for the corneal reflex, or image of the light source as reflected from the corneal surface, and the center of the pupil that correspond to known eye movements. The known eye movements are determined by having the individual look at fixation points for which the exact position is known. Typically, a central point and four points that are, respectively, 5 degrees up, down, left and right of the central point are used. These values will be used by the software to translate the pixel location of the pupil and corneal reflex to degrees of gaze.

To calibrate the POR, an occluder is used. The occluder may be made of any convenient material as, for example, a piece of No. 88A Kodak Wratten gelatin filter with a pattern of five pinholes. The size and placement of the pinholes is not critical provided that their positions are known. Pinholes of 0.6 mm in a 5 by 5 mm square arrangment with a central pinhole placed at the fitting point may be conveniently used. The occluder is placed on the single vision or progressive addition lens with the central hole of the occluder located at the optical center of the lens, or the prism reference point. The individual fixates on a small LED screen through each of the pinholes. The sequence of fixation is not critical, but using center, upper left, upper right, lower left and lower right may be convenient. The x, y pixel values for the location of each hole is recorded by an observer from the positions displayed on the screen and the angular gaze position at each hole sighting is recorded by the devices software to correlate the gaze position with the POR. Optionally, a third board may be included to capture the frame and cap position in relation to the eye to permit compensation for either or both frame and cap movement.

FIG. 1 depicts one embodiment of the devices useful in practicing the invention. As shown, a Polhemus INSIDETRAK head movement sensor 12 is placed on the individual's head and the spectacle lens 13 is placed at the appropriate position in front of the individual's eye. Attached to the front of sensor 12 is a scene camera 14 and an eye camera 16. A beam splitter 11 is positioned so that it transmits visible light and reflects infrared light. Any convenient beam splitter may be used as, for example, a dichroic hot mirror. An occluder 19 is shown on the front surface of lens 13. An infrared light source 15 provides the illumination for the system. Suitable IR light sources are known and include, without limitation, a light emitting diode with a peak of approximately 850 nm. Images from the scene and eye camera are transmitted to scene and eye monitors 17 and 18, respectively. A personal computer 20 is used, which computer is loaded with the appropriate hardware and software. For example, Polhemus INSIDETRAK software with an ISCAN RK-620-PC calibrator card and ISCAN RK-464-PC capture card.

The software used in the method of the invention is analysis and graphical software for example ISCAN'S DAQ™. The software defines scene elements, or pixels, and correlates the pixels with the eye's fixations and, thus, eye movement recorded by the eye movement camera. Eye movements are represented by cursor movement on a suitable monitor which monitor may be, without limitation, a Sony SSM930™ monitor or the like. This provides a visual track of the individual's occulomotor path with the lens in place. The system uses the center of the entrance pupil of the eye/spectacle lens optical system to track the eye movement.

Each point of regard is analyzed using conventional methods including, without limitation, MATLAB™, MATHCAD™, EXCEL™, QUATTRO™, ORIGIN™, SPSS™ and the like. For example, the point of regard at which the individual's head must move to maintain the eye's access to the intermediate vision zone of a progressive lens may be identified.

In one embodiment, a point of regard is identified at a particular distance and then one or more controlling optical parameters of the point are characterized. Alternatively, the points of regard for various distances may be identified during the performance of tasks requiring the eye to view objects at various distances. This permits determination of the widths of the various viewing zones used by the inidvidual.

A two-dimensional POR plot may be made. For example, ISCAN may store the parameters, listed below on Table 1, including the horizontal and vertical POR values in a text file. The text file is then imported into and sorted in EXCEL.

After converting the POR pixel values to positions on the lens by using the values obtained during the calibration step, the horizontal and vertical POR data can be exported to ORIGIN, SPSS or the like for statistical analysis and plotting.

TABLE 1

| | |
|---|---|
| PUP H1 | Horizontal eye position based on pupil. |
| PUP V1 | Vertical eye position based on pupil. |
| P-CRH 1 | Horizontal eye position based on pupil and corneal reflection. |
| P-CRV1 | Vertical eye position based on pupil and corneal reflection. |
| POR H1 | Horizontal POR. |
| POR V1 | Verical POR. |
| PUP D1 | Pupil diameter. |
| Head Az | Head azimuth rotation. |
| Head El | Head elevation rotation. |
| Head Rl | Head roll rotation. |
| Head X | Head position in the X direction. |
| Head Y | Head position in the Y direction. |
| Head z | Head position in the Z direction. |

In the fourth step of the method of the invention the first lens design is modified by using the information obtained to design a second lens having a second design. When multiple points of regard are identified for a progressive addition lens, widths of various viewing zones actually used may be compared with the delimitations of the widths of the vision zones of the lens. This is done by identifying the maximum unwanted astigmatism, or maximum astigmatism introduced or caused by one or more of the lens' surfaces, and spherical defocus that trigger eye and head movement, which information may be used to adjust the width of the various viewing zones of the lens being designed accordingly. Additionally, the near vision zone inset angle, channel length and location, distribution and axis of unwanted astigmatism, prism profile, binocular design features, asphericity, and aberration correction may be modified according to the individual's requirements or from the average values from sample individuals.

Modification may be carried out by any convenient method, which methods are known in the art. For example, suitable optical design algorithms and software may be used to carry out the modification of a merit function or cost function constructed to provide a global measure of an optical property. A merit function may be used to describe the sum of unwanted astigmatism values at selected points on the surface of the lens. In constructing a merit function, a list of weights is used to provide a desired weight to each area of area element of the optic. Modification of this list of weights or a function describing the weights as a function of x, y coordinates may then be carried out. Additionally, ray tracing software, or a comparable tool, is used to analyze the image quality provided by the surface and, if necessary, to further modify the weight or function.

The invention may be used to design lenses based on average POR values derived from measurements taken from a statistically significant number of individuals. Alternatively and preferably, the invention may be used to study the head and eye movements of an individual and directly use the information gathered to design a lens customized to the individual's viewing habits.

The invention will be further clarified by the following, non-limiting examples.

EXAMPLE

For each of the subjects, two-dimensional recordings of point of regard, eye movements and head movements were compared for single vision and PAL lenses while subjects carried out three visual tasks. The lenses used were SOLA VIP™ and SILOR SUPER NO-LINE™ progressive addition lenses. The optical center of each of the lenses to be tested was determined and marked in the conventional manner at the fitting cross. A gel-filter (Kodak Wratten No. 87C) with five 0.6 mm apertures arranged as center, upper left, upper right, lower left and lower right was centered and attached to the front of the lenses that was on the left eye. The central aperture was positioned at the lens' fitting cross, or the point on the lens centered on the pupil. The filter blocked visible light and allowed infra-red light to be transmitted so that head and eye movements were recorded. The individual's other eye was occluded during calibration but not occluded during measurement.

The subject fixated on a target through the central aperture of the filter and the fixation point pixel values were input into a computer. By rotating the subject's head, the subject fixated the same target through each of the four remaining apertures and the fixation point values were captured by the ISCAN programs's POR calibration routine. The software utilized the eye movement calibration to translate the video image of the eye horizontal and vertical eye position in degrees. The POR calibration then correlated those values with the position on the lens that the eye is looking through (POR). The software then recorded both the eye movement and the POR.

Each subject fixated for 15 to 20 seconds on a letter along the midline at distances of 325, 64 and 40 cm from the eye. Additionally, each subject read a 30 degrees wide text at a 17 degree angle at 64 cm. Still further, each subject maintained their head fixed while shifting their gaze horizontally left and right until the letter appeared blurred through the lens at 64 and 325 cm.

Three subjects with vision that was 20/25 or better with no pathology or binocular dysfunction were used. Each sat with the eye and head movement devices in place while the left eye was measured under binocular conditions. Each subject wore each of the three lenses set forth on Table 2, which lenses fully corrected for the subjects' refractive error. The results. Table 2 shows the data for the three subjects' preferred distance and near POR relative to the fitting point and the calculated eye path length for single vision lenses. The data suggest that the channel length provided in progressive addition lenses, typically 15 mm or more, is longer than that preferred by subjects when performing tasks with single vision lenses.

TABLE 2

| | Subject 1 | Subject 2 | Subject 3 |
|---|---|---|---|
| Distance POR | 0 mm | +2 mm | −4 mm |
| Near POR | −7 mm | −6 mm | −11 mm |
| Calculated Channel Length (Distance − Near POR) | 7 mm | 8 mm | 7 mm |

In Table 2, a positive value means that the POR was above the expected location.

In Table 3 is summarized the POR findings for the intermediate zone for two different tasks and as determined from bench measurement of the test lenses. The data suggests that, compared to single vision lenses, progressive addition lenses limit the desired zone width at intermediate distances, that different tasks result in different effective widths and that the definitional criteria used for the intermediate zone width for progressive addition lenses is not in agreement with that derived from the subject data.

TABLE 3

|  | Single Vision Lens | PAL A | PAL B |
|---|---|---|---|
| POR Visual Acuity task | 23.9 mm | 10.1 mm | 7.9 mm |
| POR Reading Task | 11.9 mm | 5.2 mm | 4.4 mm |
| Bench Measurement | 29.0 mm | 8.3 mm | 7.7 mm |

Additional testing of one brand of progressive addition lenses, as shown by Table 4, determined that the POR for distance, intermediate and near tasks did not coincide with the expected or defined locations (i.e., fitting cross for distance, one-half the distance between the distance fitting cross and near reference circle for intermediate zone and near reference circle for near). These findings suggest that subjects may not be willing to completely alter their viewing preferences to accommodate the optical design characteristics present in progressive addition lenses.

TABLE 4

|  | Subject 1 | Subject 2 | Subject 3 |
|---|---|---|---|
| Location of distance POR | +2 mm | +2 mm | +6 mm |
| Location of intermediate POR | +4 mm | −5 mm | −2 mm |
| Location of near POR | +7 mm | −1 mm | +10 mm |

What is claimed is:

1. A method for designing a spectacle lens, comprising the steps of a.) providing a first lens having a first design; b.) identifying at least one point of regard for the first lens; c.) obtaining information regarding the lens' performance using the at least one point of regard; and d.) modifying the first design using the information obtained in step c.) to provide a second lens having a second design.

2. The method of claim 1, wherein the second lens is a single vision lens.

3. The method of claim 1, wherein the second lens is a progressive addition lens.

4. The method of claim 3, wherein a front and a back surface of the second lens is a progressive addition surface.

5. The method of claim 1, wherein step b.) further comprises identifying a plurality of PORs while an object is viewed by an individual at at least two different distances.

6. The method of claim 5, wherein the object is viewed at a distant, a near, and an intermediate location.

7. The method of claim 1, wherein step b.) further comprises identifying an average location for a population for the at least one POR.

8. The method of claim 1, wherein step d.) further comprises modifying one or more of a width of a viewing zone, a near vision zone inset angle, a channel length, channel location, a channel location, a distribution of unwanted astigmatism, an axis of unwanted astigmatism, a prism profile, a binocular design feature, an asphericity, or an aberration correction.

9. A lens designed according to the method of claim 1.

10. The lens of claim 9, wherein the lens is a progressive addition lens.

11. The lens of claim 10, wherein a front and a back surface of the lens is a progressive addition surface.

12. The method of claim 1, wherein the at least one point of regard includes a point of regard off a central axis of the first lens.

13. The method of claim 1, wherein the at least one point of regard includes multiple points of regard.

14. An apparatus for measuring head and eye movement, comprising a head movement sensor, a scene camera, an eye camera, a scene monitor, an eye monitor, an infrared light source and a beam splitter capable of transmitting visible light and reflecting infrared light.

15. The apparatus of claim 14, further comprising a spectacle lens and an occluder located at an optical center of the lens.

16. The apparatus of claim 14, further comprising a spectacle lens and an occluder located at a prism reference point of the lens.

* * * * *